(12) United States Patent
Matsunaga

(10) Patent No.: US 10,616,481 B2
(45) Date of Patent: Apr. 7, 2020

(54) IMAGE COMBINING DEVICE AND IMAGE COMBINING METHOD

(71) Applicant: Olympus Corporation, Hachioji-shi, Tokyo (JP)

(72) Inventor: Takuya Matsunaga, Akiruno (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/211,120

(22) Filed: Dec. 5, 2018

(65) Prior Publication Data

US 2019/0199920 A1 Jun. 27, 2019

(30) Foreign Application Priority Data

Dec. 22, 2017 (JP) ................................. 2017-246624

(51) Int. Cl.
*H04N 5/232* (2006.01)

(52) U.S. Cl.
CPC ......... *H04N 5/23232* (2013.01); *H04N 5/232* (2013.01); *H04N 5/23293* (2013.01); *H04N 5/232123* (2018.08)

(58) Field of Classification Search
CPC ................................................. H04N 5/23232
USPC ....................................................... 348/231.6
See application file for complete search history.

(56) References Cited

U.S. PATENT DOCUMENTS

| | | |
|---|---|---|
| 8,023,000 B2 | 9/2011 | Tamaru |
| 9,253,401 B2 | 2/2016 | Ikeda |
| 9,710,922 B2 | 7/2017 | Esaki |
| 2001/0002216 A1* | 5/2001 | Chuang ..................... G06T 5/50 382/255 |
| 2001/0045982 A1* | 11/2001 | Okisu ................ H04N 5/23212 348/211.99 |

* cited by examiner

*Primary Examiner* — Joel W Fosselman
(74) *Attorney, Agent, or Firm* — John C. Pokotylo; Pokotylo Patent Services

(57) ABSTRACT

An image combining device, comprising a memory that stores a plurality of images for different focus positions, and focus positions when the plurality of images were acquired, a plurality of image processing circuits that combine the plurality of images for different focus positions to generate a combined image, and a processor that sets assignment for distributing the plurality of images for different focus positions to the plurality of image processing circuits, wherein the processor makes images for at least one focus position, among the plurality of images for different focus positions, a plural distribution image and distributes this plural distribution image to the plurality of image processing circuits, and sets assignment so that images other than the plural distribution image are distributed to any one of the plurality of image processing circuits.

18 Claims, 8 Drawing Sheets

IMAGE COMBINING DEVICE AND IMAGE COMBINING METHOD

CROSS-REFERENCE TO RELATED APPLICATIONS

Benefit is claimed, under 35 U.S.C. § 119, to the filing date of prior Japanese Patent Application No. 2017-246624 filed on Dec. 22, 2017. This application is expressly incorporated herein by reference. The scope of the present invention is not limited to any requirements of the specific embodiments described in the application.

BACKGROUND OF THE INVENTION

1. Field of the Invention

The present invention relates to an image combining device, image combining method, and a storage medium storing a program, that acquire a plurality image data while changing focus position of a focus lens, store the image data in memory, and combine a plurality of the image data that have been stored in the memory.

2. Description of the Related Art

Taking a photograph that is in focus at all focus positions is difficult. Therefore, after acquiring image data by shooting, image data is acquired by performing shooting again with a focus position having been moved, and a plurality of image data are acquired by repeating this operation. It has been proposed to combine image data that is in focus over a wide range of subject distance by combining the plurality of image data that have been stored in this memory (for example, refer to Japanese patent laid-open No. 2008-271240 (hereafter referred to as "patent publication 1")). It should be noted that this combination processing is called focus stacking processing.

In the case of performing focus stacking processing, if the number of image data becomes a lot then combination processing will take a long time. It has therefore been proposed to reduce processing time by dividing image data for every region, and performing image processing for each region in parallel (refer, for example, to Japanese patent laid-open no. 2014-123846 (hereafter referred to as patent publication 2)).

As was described previously, by performing image processing in parallel for each of regions that have been divided, it is possible to shorten processing time. It is also possible to shorten processing time if a plurality of items of image data are divided into image groups, and image processing performed in parallel for each image group. However, simply performing image processing for each of image regions results in inaccurate alignment due to the fact that there is no common image in each region, and as a result of this a finally generated focus stacked image will have low image quality. Also, similarly, by simply dividing a plurality of items of image data into image groups, since there are no common images in each image group alignment is inaccurate, and a finally generated focus stacked image will have low image quality.

SUMMARY OF THE INVENTION

The present invention provides an image combining device and image combining method that can perform focus stacking processing without degradation in image quality, and in a short time.

An image combining device of a first aspect of the present invention first comprises a memory that stores a plurality of images for different focus positions, and focus positions when the plurality of images were acquired, a plurality of image processing circuits that combine the plurality of images for different focus positions to generate a combined image, and a processor that sets assignment for distributing the plurality of images for different focus positions to the plurality of image processing circuits, wherein the processor makes an images for at least one focus position, among the plurality of images for different focus positions, a plural distribution image and sets assignment so that this plural distribution image is distributed to the plurality of image processing circuits, and images other than the plural distribution image are distributed to any one of the plurality of image processing circuits.

An image combining method of a second aspect of the present invention is an image combining method for an image combining device that comprises a memory that stores a plurality of images for different focus positions, and focus positions when the plurality of images were acquired, and a plurality of image processing circuits that combine the plurality of images for different focus positions to generate a combined image, the image combining method comprising setting assignment for distribution of a plurality of images for the different focus position to the plurality of image processing circuits, and in distribution of the plurality of images, making an image for at least one focus position, among the plurality of images for different focus positions, a plural distribution image and distributing this plural distribution image to the plurality of image processing circuits, and distributing images other than the plural distribution image to any one of the plurality of image processing circuits, and combining the plurality of images for the different focus positions to generate a combined image.

DETAILED DESCRIPTION OF THE PREFERRED EMBODIMENTS

An example where a digital camera (hereafter simply called "camera") is adopted as one embodiment of the present invention will be described in the following. This camera has an imaging section, with a subject image being converted to image data by this imaging section, this image data that has been converted being temporarily stored in memory, and the subject image being subjected to live view display on a display section arranged on the rear surface of the camera body based on this image data that has been stored. A photographer determines composition and shooting time (in the case of operating a shutter button, a shooting opportunity) by observing the live view display. At the time of a shooting instruction operation image data is stored in a storage medium. Image data that has been stored in the storage medium can be played back and displayed on the display section if playback mode is selected.

Also, if focus stacking mode has been set, respective image data is acquired at different focus positions, and this plurality of items of image data that have been required are stored in memory. The plurality of image data that have been stored in memory are then divided into at least two image groups, and focus stacking processing is performed with each image group. After focus stacking processing, a final focus stacked image is generated by subjecting this plurality of images that have been subjected to focus stacking to further focus stacking. With this embodiment, when distributing a plurality of image data to image groups, at least one reference image is included in the respective image groups.

Figure 1:
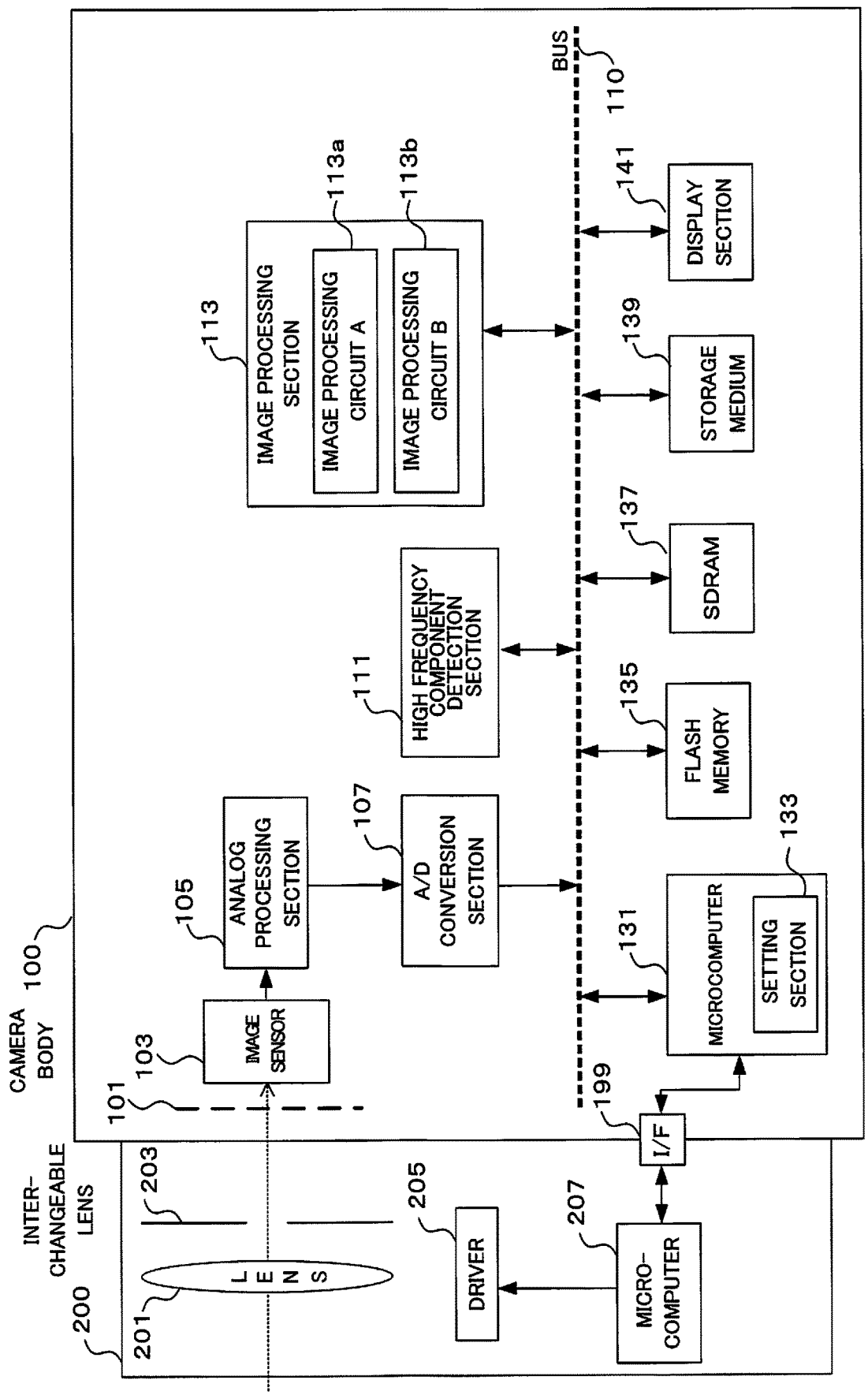
FIG. 1 is a block diagram mainly showing the electrical structure of a camera of one embodiment of the present invention.

FIG. 1 is a block diagram mainly showing the electrical structure of a camera of one embodiment of the present invention. This camera has a camera body 100 and an interchangeable lens 200 that can be attached to and detached from the camera body 100. With this embodiment, an photographing lens is an interchangeable lens, but this is not limiting, and it is also possible to have a digital camera of a type where a photographing lens is fixed to the camera body.

The interchangeable lens 200 is made up of a photographing lens 201, a diaphragm 203, a driver 205, and a microcomputer 207, and has an interface (hereafter referred to as I/F) 199 between the interchangeable lens 200 and the camera body 100, which will be described later.

The photographing lens 201 is constituted by a plurality of optical lenses (including a focus lens for focus adjustment) for forming a subject image, and is a fixed focal length lens or a zoom lens. The diaphragm 203 is arranged behind the optical axis of this photographing lens 201. This diaphragm 203 has a variable opening diameter, and controls an amount of subject light flux that has passed through the photographing lens 201.

Also, the photographing lens 201 can be moved in the optical axis direction by the driver 205. The driver 205 can move the focus lens within the photographing lens 201 based on control signals from the microcomputer 207, and as a result focus position is controlled, and in the case of a zoom lens focal length is also controlled. The driver 205 also performs control of opening diameter of the diaphragm 203. The driver 205 comprises a drive circuit for the photographing lens 201 and a drive circuit for the diaphragm 203.

The microcomputer 207 that is connected to the driver 205 is connected to the I/F 199. The microcomputer 207 operates in accordance with a program stored in the flash memory, to perform communication with a microcomputer 131 within the camera body 100, which will be described later, and perform control of the interchangeable lens 200 based on control signals from the microcomputer 131. In the event that focus stacking mode is set, the microcomputer 207 sequentially moves focus position between a specified focus position at the infinity side and a specified focus position at the close up side.

The microcomputer 207 acquires focus position of the focus lens from a focus position detection section (not illustrated). The microcomputer 207 acquires zoom position of a zoom lens from a zoom position detection section (not illustrated). The acquired focus position and zoom position are transmitted to the microcomputer 131 within the camera body 100.

Inside the camera body 100, a mechanical shutter 101 is arranged on the optical axis of the photographing lens 201. This mechanical shutter 101 controls the time for which subject light flux passes, and a well-known focal plane shutter, for example, or the like is adopted. Behind this mechanical shutter 101, an image sensor 103 is arranged, at a position where the subject image is formed by the photographing lens 201.

The image sensor 103 has photo diodes constituting each pixel arranged in a two dimensional matrix shape. Each photodiode generates photoelectric conversion current in accordance with received light amount, and this photoelectric conversion current is the subject of charge storage by a capacitor connected to each photodiode. A Bayer array RGB filter is arranged on the front surface of each pixel. The image sensor 103 also has an electronic shutter. This electronic shutter carries out control of exposure time by controlling the time from charge storage until charge readout of the image sensor 103. The image sensor 103 is not limited to a Bayer array, and a layered type such as Foveon (Registered trademark), for example, can also be used. The image sensor 103 functions as an image sensor that acquires image data by forming a subject image. Also, when focus stacking mode is set, the focus lens moves sequentially in the optical axis direction, and the image sensor 103 performs imaging at these focus positions that have been moved, and outputs an image signal. Specifically, the image sensor 103 functions as an image sensor that acquires a plurality of images for different focus positions.

The image sensor 103 is connected to an analog processing section 105, and this analog processing section 105 has an analog processing circuit. The analog processing section 105 performs wave shaping on the photoelectric conversion signals (analog image signals) that have been read out from the image sensor 103 after reducing reset noise etc., and also carries out gain increase so as to achieve an appropriate signal level.

The analog processing section 105 is connected to an A/D conversion section 107. This A/D conversion section 107 has an A/D conversion circuit, and performs analog to digital conversion on the analog image signals, and outputs the digital image signals (hereafter referred to as image data) to a bus 110.

The bus 110 is a transfer path for transferring various data, that has been read out or generated inside the camera body 100, within the camera body 100. Besides the above described A/D conversion section 107, a high frequency component detection section 111, an image processing section 113, the microcomputer 131, flash memory 135, SDRAM (Synchronous Dynamic Random Access Memory) 137, storage medium 139 and a display section 141 are connected to the bus 110.

The high frequency component detection section 111 may have a high frequency component detection circuit, and may apply filter processing for edge detection, disclosed in Japanese patent laid open number 2016-32265, for example. The high frequency component detection section 111 is input with image data that has been output from the A/D conversion section 107, and detects high frequency components within the image data (refer to S29 in FIG. 9, which will be described later). Detection of high-frequency components may be, for example, extraction of edge components of an image, and making pixel values of the edge components high-frequency component values. An edge component is a change value for color or brightness value, and may be a difference between pixel values of adjacent pixels. Also, as will be described later, in order to exclude images in which there are few high-frequency components from consideration as reference images, an average value of high-frequency components of a plurality of images is calculated, and may be made a threshold value for plural distribution image determination (refer to S27 and S29 in FIG. 9). The high frequency component detection section 111 functions as a high-frequency component detection circuit that detects high-frequency components of a plurality of images for different focus positions.

The image processing section 113 has a plurality of image processing circuits. With the example shown in FIG. 1, there are two image processing circuits in the image processing section 113, namely the image processing circuit A 113*a* and the image processing circuit B 113*b*, but there may also be three or more image processing circuits. Each of the image processing circuits 113*a* and 113*b* has an image conversion circuit for converting a general Raw image to a YC image (for example, YCbCr conversion), and an image combining circuit etc. for subjecting a plurality of images to combination processing (for example, focus stacking processing). The image processing circuit A 113*a* and the image processing circuit B 113*b* may be completely the same, or may be different, such as the provision or non-provision of some processes being different. Also, exchange of image data may be made possible between the image processing circuit A 113*a* and the image processing circuit B 113*b* within the image processing section 113. The image processing section 113 functions as a plurality of image processing circuits that generate a combined image by combining a plurality of images for different focus positions.

In a case where focus stacking mode is set, the image processing circuit of the image processing section 113 can combine an image having a larger depth of field than a normal single image using a plurality of images for different focus positions. Specifically, an image combination processing circuit performs alignment on a plurality of items of image data that have been taken at a plurality of focus positions, extracts regions of high image sharpness (contrast), and combines regions of high sharpness. As a result of this combination image data having a larger depth of field than a single image is generated.

The microcomputer 131 is a processor having a CPU (Central Processing Unit), peripheral circuits of the CPU, and memory etc. The microcomputer provides a function as a control section for this entire camera, and performs overall control of various sequences of the camera in accordance with programs stored in the flash memory 135. Besides the previously described I/F 199, an operation section is connected to the microcomputer 131. Also, an interface for detecting operating states of operation members such as a release button and power switch etc. is connected to the microcomputer 131. It should be noted that a shooting instruction from the photographer may be performed using a full press operation of the release button, and a shooting preparation instruction may be performed using a half press operation of the release button. Obviously a shooting instruction may also be performed using a touch operation on a touch panel or the like.

The microcomputer 131 (processor) also has a setting section 133. With this embodiment, this setting section 133 is implemented by a program that is stored in the flash memory 135. It should be noted that functions of the setting section 133 may also be implemented in software, using the CPU within the processor. As examples of further implementations, the setting section 133 may also be implemented in hardware using peripheral circuits within the processor. Also, the functions of the setting section 133 are not limited to a single processor, and may also be dispersed among a plurality of processors.

The setting section 133 sets which of the plurality of image processing circuits, such as the image processing circuit A 113*a* and the image processing circuit B 113*b*, a plurality of image data that have been output from the image sensor 103 are distributed to. This distribution is determined in accordance with shooting conditions of the plurality of images. There may be images that are distributed to any single image processing circuit, and there may be images that are distributed to a plurality of image processing circuits. For example, in FIG. 3B, which will be described later, reference image (P5) is distributed to both image processing circuits A and B (since this image is distributed to a plurality of image processing circuit it is called a "plural distribution image"), but other images P1 to P4, and P6 to P10, are distributed to one of either image processing circuit A or B. Images that are made reference images at the time of focus stacking are also set here (refer, for example, to reference image P5 in FIG. 3B).

The setting section 133 functions as a processor (setting section) that sets assignment for distribution of a plurality of images for different focus positions to a plurality of image processing circuits. This processor (setting section) sets assignments such that an image of at least one focus position, among a plurality of images for different focus positions, is made a plural distribution image (for example, image P5 in FIG. 3B, image P3 in FIG. 6A) and distributed to a plurality of image processing circuits (for example, the image processing circuit A and the image processing circuit B in FIG. 4 and FIG. 6A), while images other than the plural distribution images (for example, images P1 to P4 and P6 to P10 in FIG. 3B, images P1, P2, P4, P5, and images P6 to P10 in FIG. 6A) are distributed to either of the plurality of image processing circuits (for example, image processing circuit A or image processing circuit B). For example, with the example shown in FIG. 3B, which will be described later, a shared plural distribution image is distributed to image processing circuit A and image processing circuit B, and it is possible to generate a combined image with this shared plural distribution image as a reference. Since image combination is performed with the shared image as a reference, it is possible to prevent degradation in image quality.

Also, the above described processor (setting section) makes a first combination reference image (for example, image P1 in FIG. 6A) as a reference for combination from among the plurality of images for different focus positions. The setting section selects a plural distribution image (image P3 with the example in FIG. 6A, and image P4 with the example in FIG. 6B) in accordance with an interval between focus position of an image (for example, image P6 in FIG. 6A, image P6 in FIG. 6B) for a focus position that is closest to the first combination reference image, among a plurality of images for different focus positions that have been distributed to an image processing circuit (for example, the image processing circuit B in FIG. 6A) that the first combination reference image was not distributed to, and focus position of the first combination reference image. Specifically, a plural distribution image that would constitute a reference at the time of image combination is determined in accordance with an interval between focus positions of images distributed to a plurality of image processing circuits (refer to S25 and S27 in FIG. 9).

Also, if an interval between focus positions is wider than a specified interval (for example, specified distance L1 in FIG. 6A) (refer to FIG. 6A), the above described processor (setting section) selects the image (for example image P3 in FIG. 6A) other than the first combination reference image (for example, image P1 in FIG. 6A) as a plural distribution image. On the other hand, if the interval between focus positions is narrower than a specified interval (refer, for example, to FIG. 6B), the processor (setting section) selects the first combination reference image as a plural distribution image. Specifically, for the plural distribution image that will be a reference at the time of image combination, in a case where an interval between focus positions is narrow, between a plurality of image processing circuits, the first combination reference image is determined as the plural distribution image, while when the interval between focus positions is wide an image that satisfies specified conditions is determined as the plural distribution image (referred to S25 and S27 in FIG. 9). This means that the processor (setting section) can set an appropriate reference image for when generating a combined image. As a result, it is possible to prevent image quality degradation of the combined image.

Also, the above described processor (setting section), in addition to setting the first combination reference image (image P6 with the example of FIG. 8), sets a plural distribution image to a second combination reference image (image P8 with the example of FIG. 8), and sets either the first combination reference image or the second combination reference image to a combination reference image in respective image processing circuits (in the example of FIG. 8 this is image P6 in image processing circuit A, image P6 in image processing circuit B and image P8 in image processing circuit C), and the image processing circuits sequentially perform combination from an image that is close to a focus position in the combination reference image that has been set by the processor (setting section), among images that have been distributed. Since the second combination reference image is set in addition to the first combination reference image, and images that will constitute a reference at the time of generating a combined image are distributed to the image processing circuits, it is possible to perform setting of appropriate reference images even in a case where images are divided into three or more image groups.

Figure 9:
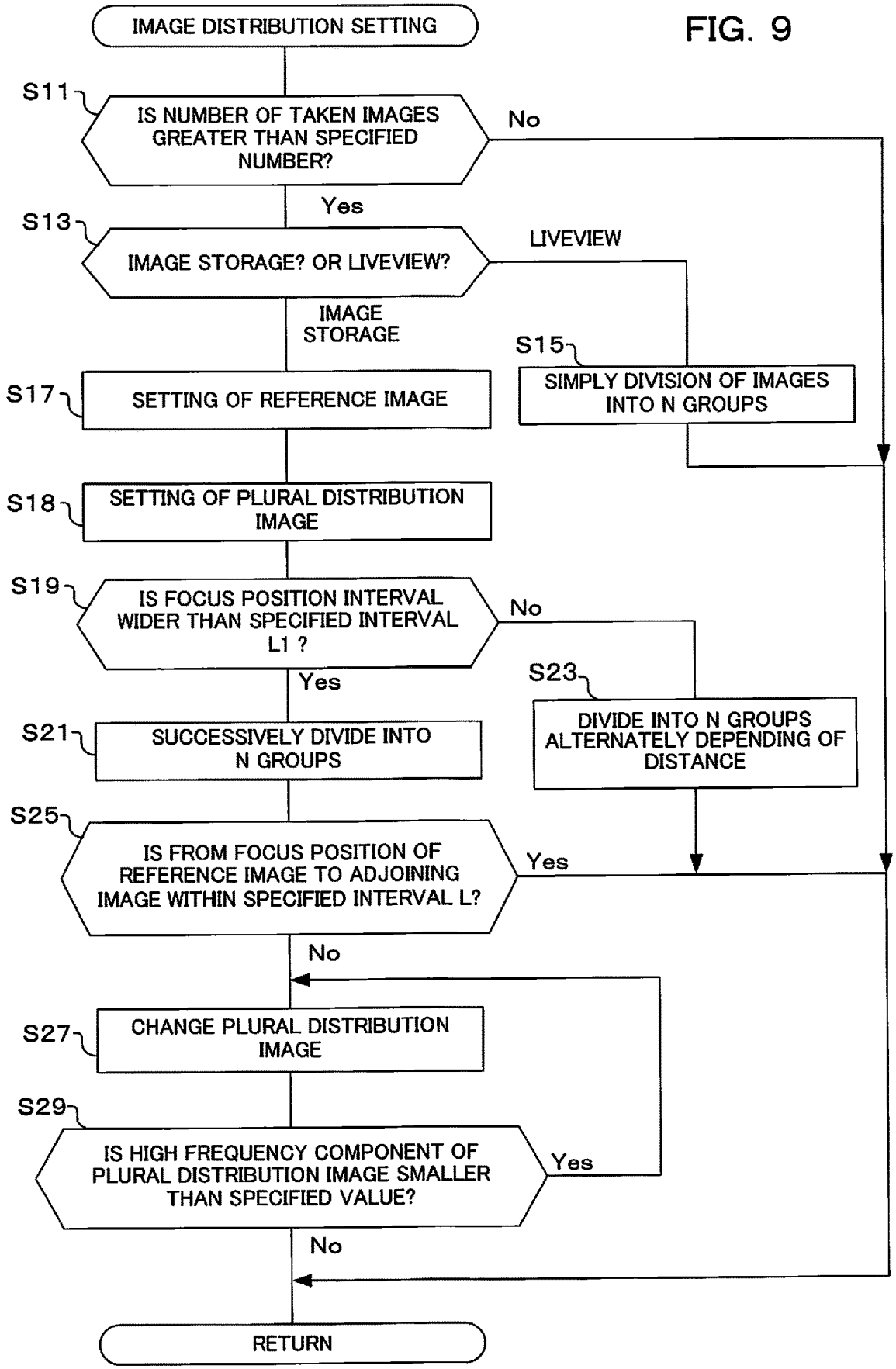
FIG. 9 is a flowchart showing operation for image distribution setting, for a camera of one embodiment of the present invention.

The above described processor (setting section) selects a plural distribution image based on results of having compared respective high frequency components of a plurality of images for different focus positions with a threshold value (refer, for example, to S29 and S27 in FIG. 9). For example, in a case where there are few high-frequency components in an image (plural distribution image) that has been output as a reference image to a plurality of image processing circuits, the possibility of that plural distribution image being an out of focus image is high, and it will not be suitable as a reference image at the time of image processing. With this embodiment therefore, selection is performed again so that an image that has more high frequency components than a threshold value becomes a plural distribution image.

It should be noted that the threshold value mentioned above is set based on an average value of respective high frequency components of a plurality of images for different focus positions. The level of high frequency components of image data that has been respectively acquired at different focus positions, while sequentially changing focus position, differs depending on the subject. This makes it difficult to always determine threshold values in the same way. With this embodiment therefore, the threshold value is made a value corresponding to average value of respective high frequency components of a plurality of images.

Figure 7:
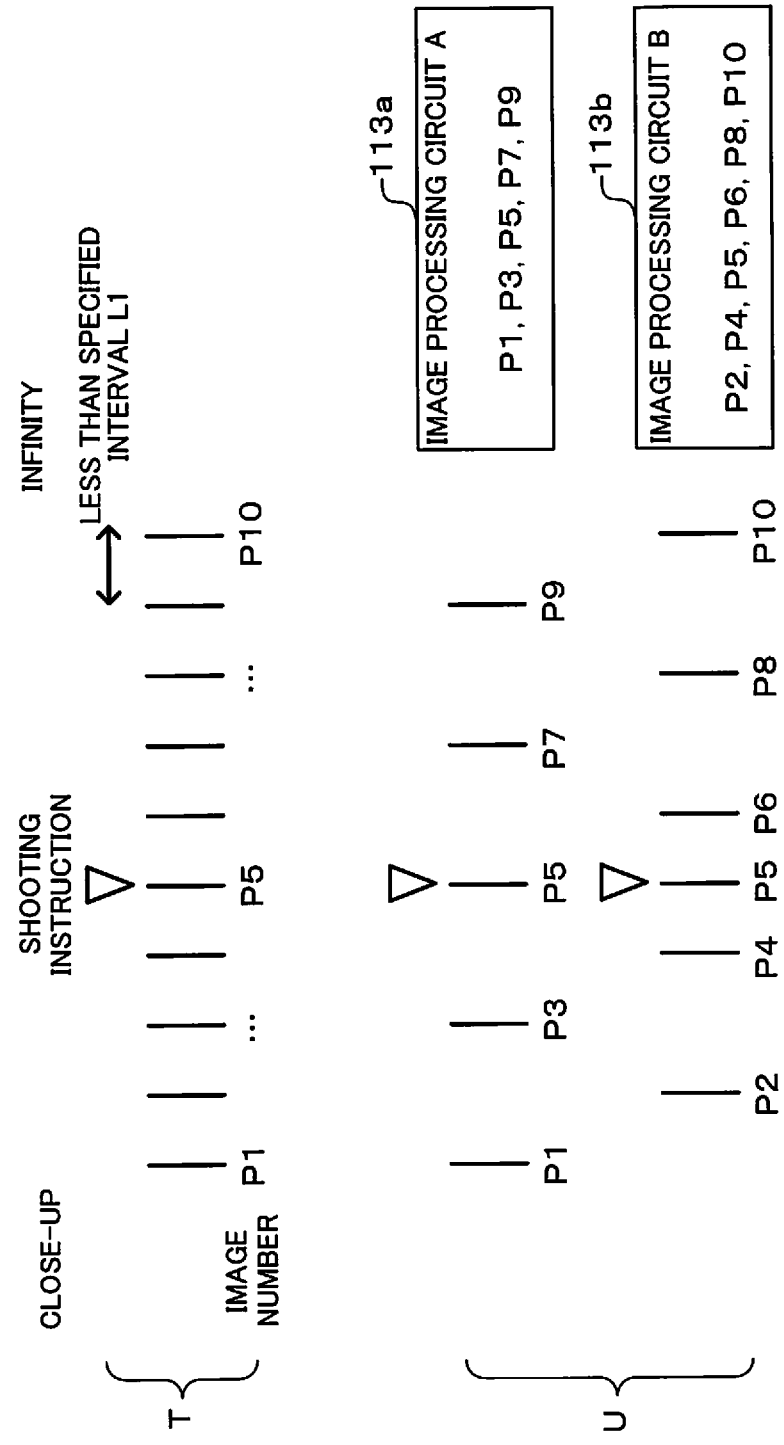
FIG. 7 is a drawing showing another example of image input and image division, in the camera of one embodiment of the present invention.

Also, the processor (setting section) mentioned above changes assignments for images to be distributed to either of a plurality of image processing circuit in accordance with interval between respectively adjoining focus positions of a plurality of images for different focus positions (refer, for example, to FIG. 7, and to S19, S21, and S23 in FIG. 9). A plurality of image data used in image combination processing are acquired for every predetermined focus position interval. In a case where an interval between focus positions where images for focus stacking have been taken are quite far apart, alignment of images becomes difficult, and so it is preferable for an interval between focus positions to be close to a certain extent. On the other hand, with a wider focus position range of images used in combination by respective image combination circuits, it is possible to acquire images of high precision when generating a final image, using images that have been combined by respective image combination circuits. Therefore, with this embodiment, in the case where focus position interval is narrow, and a case where the interval is wide, combinations of images used in each image processing circuit are changed so as to give optimal results.

Also, the processor (setting section) described above divides images to close up side and infinity side in the event that comparison of interval between respectively adjoining focus positions of a plurality of images for different focus positions and a specified value is wider than the specified value, while if the interval is narrower than the specified value alternatively divides in accordance with respective focus positions (refer, for example, to FIG. 7, and to S19, S21, and S23 in FIG. 9). As was described previously, with this embodiment, in a case where focus position interval is narrow, and a case where the interval is wide, combinations of images used in each image processing circuit are changed. As a method for this change, with this embodiment, if the focus position interval is narrow there is alternate division so that images in as wide a focus position range as possible can be processed in one image processing circuit, while if the focus position range is wide there is division to close up side and infinity side so that alignment of images becomes easy, in other words images are divided into image groups with a specified focus position as a border (one, or two or more).

The processor (setting section) also sets assignments so that if combined images are stored in the storage medium the plural distribution image is distributed to a plurality of image processing circuit, while if combined images are displayed on the display section without being stored in the storage medium the plural distribution image is distributed to any one of the image processing circuits (refer, for example, S13 to in FIG. 9). As a combined image for storage, it is preferable to generate a combined image of high precision by distributing the plural distribution image to each image processing circuit. On the other hand for a combined image for display, since it is preferable to perform combination processing at high speed even with low accuracy, distribution of the plural distribution image is not performed.

The flash memory 135 stores a program for executing the various sequences of the microcomputer 131. The microcomputer 131 performs overall control of the camera based on this program. It should be noted that memory is not limited to flash memory, and may be nonvolatile memory that can be electrically rewritten. As another implementation of the memory, there may be non-volatile memory that can not be electrically rewritten (for example, mask ROM).

The SDRAM 137 is an electrically rewritable volatile memory for temporary storage of image data etc. This SDRAM 137 temporarily stores image data that has been output from the A/D conversion section 107, and image data that has been processed in the image processing section 113. Also, when temporarily storing image data, the image data is stored in association with position of the focus lens (focus position) when the image data was acquired. The SDRAM 131 functions as a memory for storing a plurality of images for different focus positions that have been prepared in advance, and focus positions at the time the plurality of images were acquired. It should be noted that both of the previously described flash memory 135 and storage medium 139, which will be described later, or either one of them, may store a plurality of images for different focus positions and focus positions at the time that the plurality of images were acquired.

The storage medium 139 is a storage medium such as a memory card that can be loaded into and taken out of the camera body 100, but this is not limiting and it may also be a hard disk or the like built into the camera body 100. For image data that was acquired by the image sensor 103 when the shooting instruction button was operated, image data that has been subjected to image processing for storage is stored. Also, when focus stacking mode has been set image data that has been subjected to focus stacking processing by the image processing section 113 is also stored. The storage medium 139 functions a memory for storing combined images.

The display section 141 has a display panel, is arranged on a rear surface or the like of the camera body 100, and performs image display. As a display panel it is possible to adopt various display panels such as a liquid crystal display panel (LCD, TFT), or organic EL etc. The display panel may also be a type that is observed through an eyepiece, such as an electronic viewfinder (EVF). Live view display and playback display etc. of stored images are performed on the display section 141. The display section 141 functions as a display for displaying combined images.

Next, main operation, mainly when focus stacking mode has been set, will be described using the flowchart shown in FIG. 2. The flowchart shown in FIG. 2 (the same applies to the flowchart shown in FIG. 9, which will be described later) is executed by the microcomputer 131 controlling each section in accordance with a program stored in the flash memory 135. In the event that focus stacking mode has been set, this flow is executed at the time of live view display, or at the time of shooting for storage when the shooting instruction button has been operated.

Figure 2:
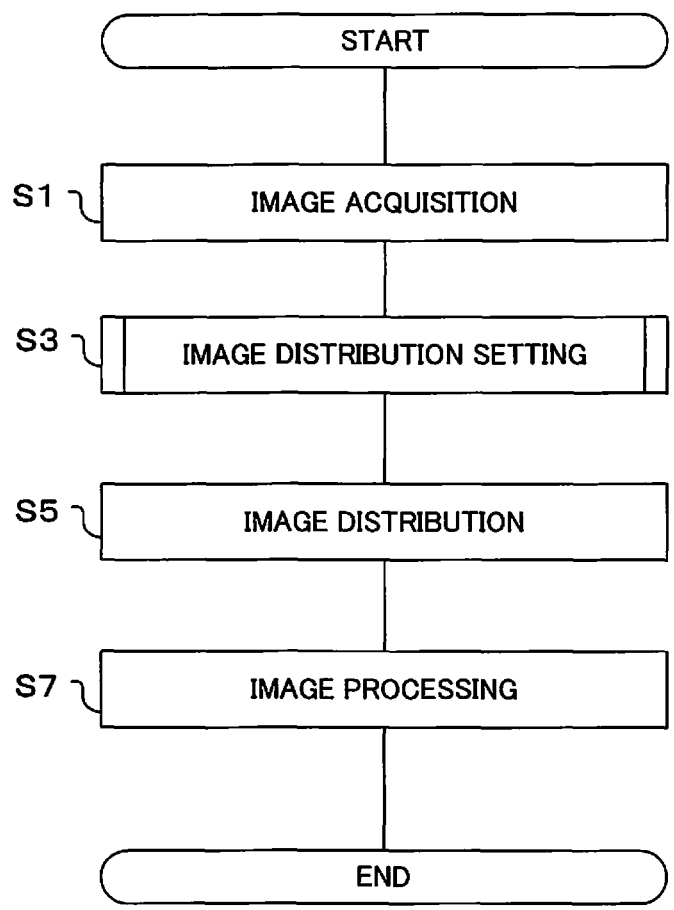
FIG. 2 is a flowchart showing main flow of focus stacking processing of a camera of one embodiment of the present invention.

If the main flow shown in FIG. 2 is started, first, image acquisition is performed (S1). In this step, a plurality of images for different focus positions are taken and acquired. Specifically, once image data has been acquired for an initial focus position, a focus lens is moved to the next focus position, and aperture value control is performed by the diaphragm 203 at this focus position. Shooting is then performed by performing control of exposure time using the mechanical shutter 101 or the electronic shutter of the image sensor 103. Shooting is performed at a predetermined focus position, and operation is repeated until a predetermined number of items of image data have been acquired. Image data that has been acquired is associated with the focus position at which shooting took place, and stored in the SDRAM 137.

In order to acquire a plurality of items of image data, a shooting position interval is changed in accordance with photographer settings, and shooting conditions such as aperture, focal length, focus position etc. For example, focus position interval becomes wider with increased aperture opening, becomes wider as focal length become shorter, and becomes wider as focus position moves closer to infinity. Conditions for narrowing shooting position interval are the opposite to the above described conditions for widening. Also, in the event that the photographer sets focus position interval, the photographer may set the shooting position interval manually with permissible circle of confusion $\delta$ of the lens 201 as a reference. The interval is set so that the permissible circle of confusion $\delta$ becomes unity, three times, ten times, twenty times, or preferably, five times etc.

Once images have been acquired, next image distribution setting is performed (S3). Here, the setting section 133 divides the plurality of image data that were acquired in step S1 into a plurality of image groups. With this embodiment the plurality of image data are divided into two image groups, and distributed to one of the image processing circuit A 113a or the image processing circuit B 113b. At the time of distribution, for example, image data of a reference image is distributed to both of the two image processing circuits, namely image processing circuit A and image processing circuit B (the reference image at this time is called a plural distribution image), and remaining images are distributed to either one of the image processing circuits A and B. Also, the distribution destination is changed in accordance with interval of focus positions at which the plurality of image data were required, and high frequency component amount. Details of this image distribution will be described later using FIG. 3A to FIG. 9.

Once setting for image distribution has been performed, next distribution of images is performed (S5). Here, image data is accordingly distributed to the distribution destinations that were determined in step S3, namely, each of the image processing circuit A 113a and the image processing circuit B 113b. If there is spare capacity in the memories of each of the image processing circuits A and B, the plurality of image data may be gathered together and transmitted to the image processing circuit in one go, or image data that is stored in the SDRAM 137 may be transmitted at the time an image is used by each image processing circuit.

Once images have been distributed, image processing is performed next (S7). Here, the image processing section 113 applies general image processing in order to convert RAW images to YC images. For example, OB subtraction, white balance correction, color conversion processing, gamma correction, edge enhancement, etc. are performed.

Also, the image processing section 113 performs combination processing for a plurality of input image data. An example of generating an image having a large depth of field from a plurality of images for different focus position (so-called focus stacking processing) will be described as combination processing. In generating an image having a large depth of field, alignment is performed between images. Images that have been taken at different focus positions may be offset if the same point of the subject is compared.

Alignment between images reconciles this offset (this alignment references a reference image, as will be described later). If alignment between images has been performed, next high-frequency components of each image are extracted and combined. If shooting is performed at different focus positions, regions that are in focus will differ depending on the image. Therefore, regions that are in focus within each image, namely regions that have a lot of high-frequency components, are extracted, and regions that have been extracted within each image are combined to generate a single image. At the time of combination, one image among the plurality of images is made a reference image for combination, and other images are sequentially combined with the reference image.

In this way, with this embodiment, if a plurality of image data is required for image combination (refer to S1), the plurality of image data are divided into a plurality of image groups so that it is possible to perform image processing in parallel in a plurality of image processing circuits (S3, S5), each image processing circuit performs combination processing for every image group, and final combination image processing is performed using image data that has been output from each image processing circuit. This means that it is possible to generate a combined image in a short time, by performing image processing with a single image processing circuit. Also, at the time of image combination, since combination processing using a shared reference image is performed in each image processing circuit it is possible to precisely perform alignment, and it is possible to prevent degradation in image quality.

Figure 3A:
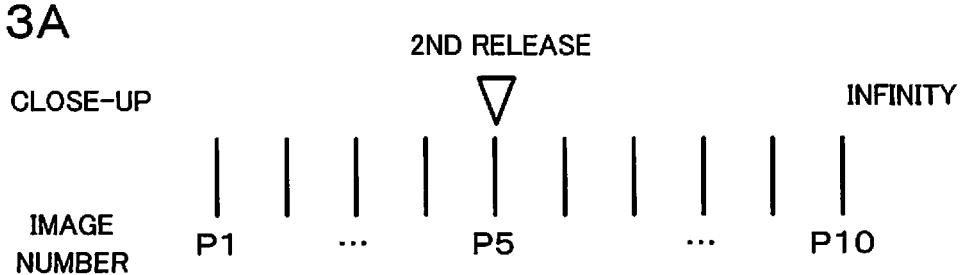
FIG. 3A and FIG. 3B are drawings showing examples of image input and image division, in the camera of one embodiment of the present invention.
Figure 3B:
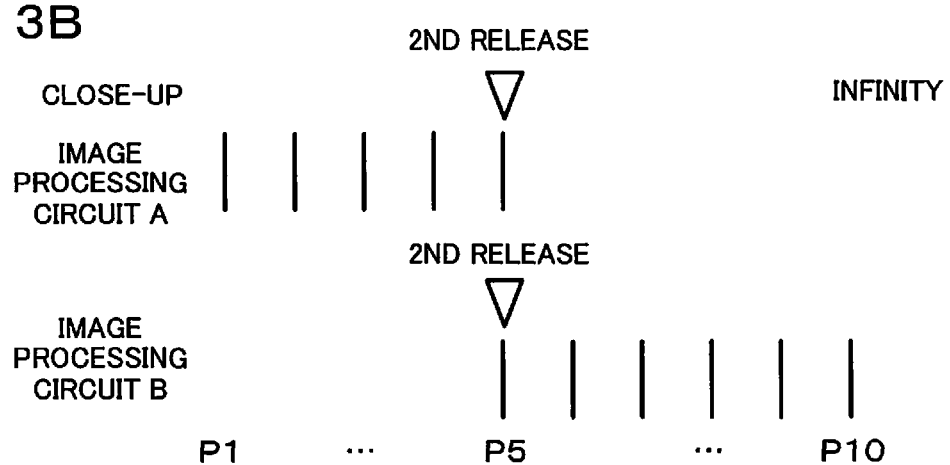

Next, an example where a plurality of image data are distributed to two image processing circuits, namely the image processing circuit A 113a and the image processing circuit B 113b, will be described using FIG. 3A and FIG. 3B. FIG. 3A shows one example of a plurality of images for different focus positions of a focus lens. In FIG. 3A and FIG. 3B, the left side is made the close-up side and the right side is made the infinity side, positions are vertical lines represent shooting positions, and P1 . . . P5 . . . P10 are image numbers at each shooting position. With a number of taken images being ten, if a focus position at the time that a shooting instruction button has been operated is made P5, then with the example shown in FIG. 3A images are acquired by changing the focus position uniformly toward the close up side and the infinity side. A reference image at the time of image combination may be, for example, an image at the focus position at the time the shooting instruction button was operated, and with the examples shown in FIG. 3A and FIG. 3B image P5 is made the reference image.

Here, if the plurality of images are divided into two image groups, they may simply be divided into close up side focus positions and infinity side focus positions, and in this case the images are divided into two groups of five images, namely images P1 to P5, and images P6 to P10. However, with this method of division, if combination processing proceeds with the two respective groups of divided images, errors will arise in alignment and high frequency components that are extracted between the two combined images that are generated by the respective image processing circuits. As a result, if a combined image that has been generated with images divided into two, and a combined image that has been generated by sequentially combining without dividing the images, are compared, degradation in image quality, such as ghosting, will arise in the combined image that was generated using images that were divided into groups. This ghosting is an image that is caused by the outline of the subject being depicted numerous times.

This image quality degradation can be resolved by distributing the same images to both of the two image processing circuits. Taking this case of 10 images for combination as an example, the reference image P5 is made a plural distribution image that will be distributed to both of the two image processing circuits, with images P1 to P5 being distributed to image processing circuit A, and image P5, and images P6 to P10, being distributed to image processing circuit B. In order to distribute an image to the image processing circuits A and B, information relating to shooting position is associated with the image. It should be noted that when distributing images, there are cases where the number of images that are distributed to both image processing circuits is not uniform. With the example shown in FIG. 3B a single extra image that makes the number of images to each image processing circuit non uniform is set aside at the infinity side.

It should be noted that in FIG. 3B there are five close up side images and six infinity side images, but if the number of close up side images is made six images P1 to P6 may be distributed to image processing circuit A, and image P5, and images P7 to P10 may be distributed to image processing circuit B. If an uneven number of images are distributed to the image processing circuit A and the image processing circuit B processing speed improvement effects will be reduced, and so close to the same number of images are preferably distributed to each image processing circuit.

Next, image combination processing for case where a plurality of images are distributed, as shown in FIG. 3B, will be described using FIG. 4. It should be noted that this image combination processing is executed in step S7 of FIG. 2.

Sequential combination proceeds in the image processing circuit A and the image processing circuit B together, with P5 as a reference image. Specifically, image processing circuit A first performs focus stacking processing using reference image P5 and another image P4, to generate focus stacked image P5+P4. Next focus stacking processing is performed using focus stacked image P5+P4 and image P3. Subsequently focus stacking processing is sequentially performed using images P2 and P1, and combined image PA is generated (refer to FIG. 4). On the other hand, image processing circuit B first performs focus stacking processing using reference image P5 and another image P6, to generate focus stacked image P5+P6. Next focus stacking processing is performed using focus stacked image P5+P6 and image P7. Subsequently focus stacking processing is sequentially performed using images P8, P9 and P10, and combined image PB is generated (refer to FIG. 5).

In this way, combined images PA and PB that were generated by the respective image processing circuits are combined in either of the image processing circuit (image processing circuit B in FIG. 4), and a final focus stacked image PAB is generated. It should be noted that the order of focus stacking in image processing circuits A and B is preferably the sequentially combination with the reference image from an image whose focus position is closer to that of the reference image.

Next, processing time for focus stacking of this embodiment will be described using FIG. 5. The horizontal axis direction shows a lapse of time, and a single rectangle represents a single iteration of combination processing. Also, the upper part S of the drawing shows a case where all focus stacking processing is performed using only image processing circuit A (image processing circuit 113a), while the lower part D of the drawing shows a case where focus stacking processing is performed in parallel using the two circuits, namely the image processing circuits A and B (image processing circuits 113a and 113b).

The upper part S of the drawing shows a case where 10 images are sequentially combined using a single image processing circuit. In this case, the reference image and close up side images are combined first, for example, and after that if infinity side images are sequentially combined with the combined image the number of times combination is performed is nine, as shown in FIG. 5. Specifically, for the first combination image P1 is combined with reference image P5, then in the second combination image P2 is combined with the combined image, and after that images P3 to P4, and images P6 to P10 are similarly sequentially combined with the combined image. With this combination method combination time becomes the time required to perform combination nine times.

On the other hand, in the case of combination by distributing these ten images to two image processing circuits (image processing circuit A and image processing circuit B), combination processing proceeds by operating in parallel in the respective image processing circuits. In this case, combined images that have been generated by the respective image processing circuits are combined with other images by an image processing circuit, to generate a final combined image.

Figure 5:
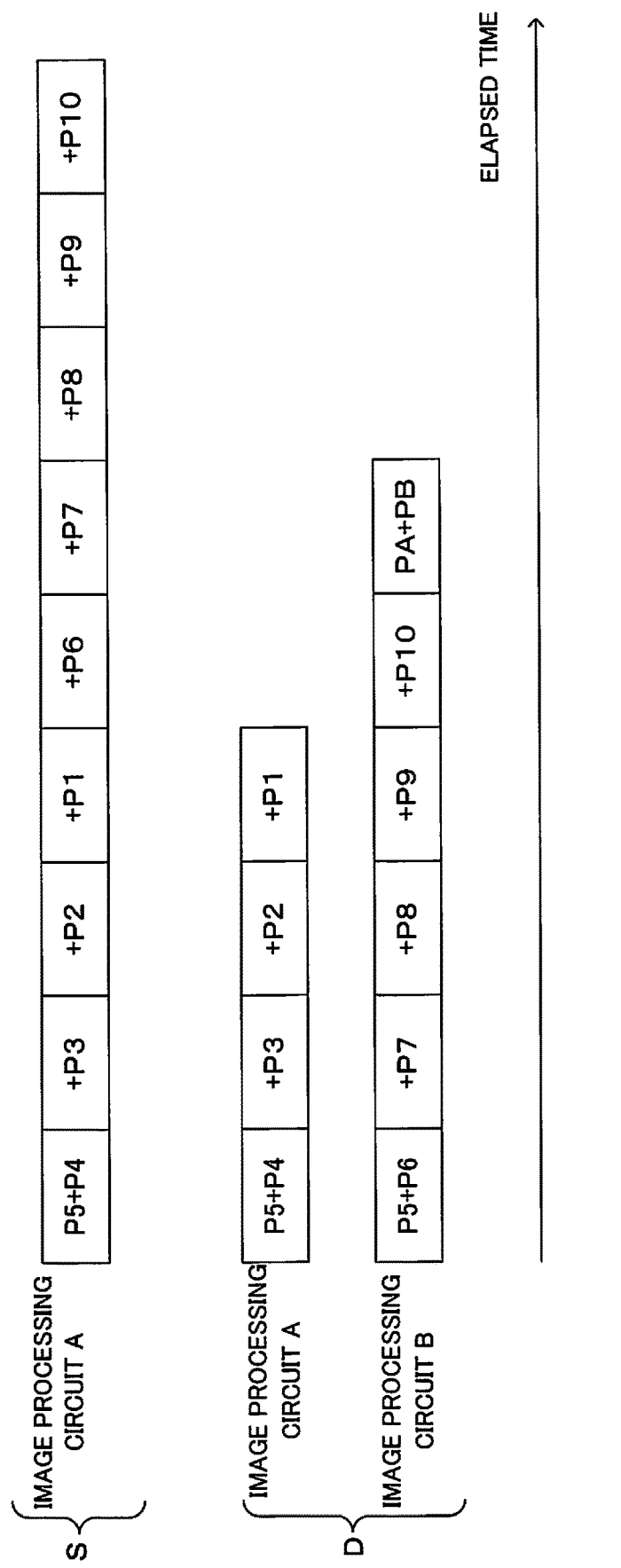
FIG. 5 is a drawing showing comparison of processing times, in the camera of one embodiment of the present invention.

Specifically, with the example shown in the lower part D of FIG. 5, the reference image P5 is commonly distributed to the image processing circuit A and the image processing circuit B, and further images P4 to P1 are distributed to image processing circuit A while images P6 to P10 are distributed to image processing circuit B. The image processing circuit A then performs focus stacking using the reference image P5 and images P4 to P1, while the image processing circuit B performs focus stacking using the reference image P5 and images P6 to P10.

As shown in FIG. 5 all combination processing is completed in the time required to perform combination six times. It should be noted that since the final combination processing is performed by image processing circuit B, time is required to transmit the combined image that was combined by image processing circuit A to the circuitry of image processing circuit B, but here this has been omitted for simplicity.

In this way, since combination processing proceeds in parallel, combination with a plurality of image processing circuit can shorten total combination time compared to combination with a single image processing circuit. Also, the same image (reference image P5) is distributed to each image processing circuit, and combination processing is performed in each image processing circuit with images aligned with this same image as a reference. As a result, a reference position in each image processing circuit becomes the same, and it is therefore possible to achieve a reduction in combination time due to parallel processing without any degradation of the combined image.

With the example shown in FIG. 5 there are two image processing circuits, but if three or more image processing circuits are used it is possible to further shorten total combination time. In particular, in a case where they are many images that are acquired (this number of images will be called total number of combined images) in order to perform focus stacking, it is possible to achieve the effect of shortening combination time by using many image processing circuits.

Here, in a case where total number of combined images is every even number, as shown in FIG. 5 (with image processing circuit A number of combinations for images P1 to P5 is four, and with image processing circuit B number of combinations for P5 to P6 is six), if a particular image (reference image P5) is distributed to both image processing circuits the overall number of combinations is increased by one compared to a case where this is not performed. Therefor, the processing method may be switched such that in a case where it is desired to prioritize image quality, for example, this same image distribution processing may be performed at the time of generating stored images, while on the other hand in a case where it is desired to prioritize processing speed, this processing is not performed at the time of generating images for live view display, for example (refer to S13 in FIG. 9, which will be described later).

Also, since there is no improvement to processing time achieved by parallel processing with two image processing circuits in a case where there are not many images that will be combined (three images, for example), a plurality of image processing circuits should be used for cases of a number of images that is expected to improve processing time, for example, five images or more (refer to S11 in FIG. 9 which will be described later.).

Next, another example where a plurality of image data are distributed to image processing circuits, namely the image processing circuit A 113a and the image processing circuit B 113b, will be described using FIG. 6A and FIG. 6B. With the previously described example that was shown in FIG. 3A and FIG. 3B, image P5 that is made a combination reference was substantially in the middle of shooting focus positions of a plurality of images. Generally, a reference image is an image that has been taken at a focus position at the point in time when a shooting instruction button has been operated. However, with actual shooting, at the time a shooting instruction button has been operated there may be cases where focus position is positioned in the vicinity of the close up end or the infinity end of a range in which lens drive can be performed.

As a result, in a case where focus position of a reference image is in the vicinity of the close-up end or the infinity end of a range in which lens drive can be performed, if a plurality of image data are divided into two image groups, and respectively distributed to image processing circuits, together with the distribution of a reference image to both image processing circuits, and a focus stacked image generated, image quality will be degraded.

Figure 6A:
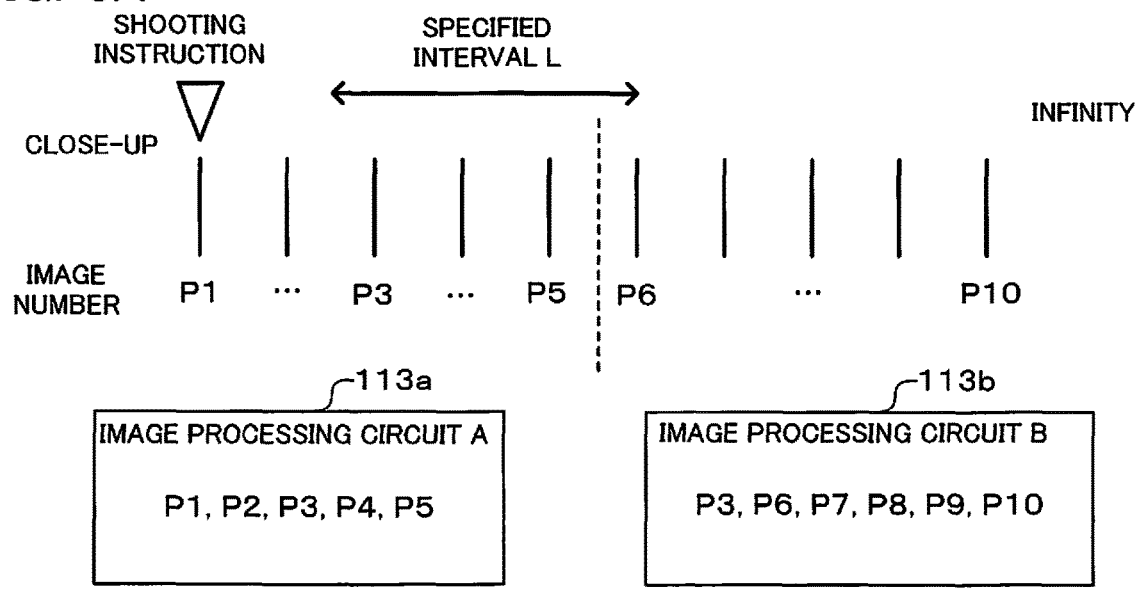
FIG. 6A and FIG. 6B are drawings showing other examples of image division, in the camera of one embodiment of the present invention.

For example, FIG. 6A is a case where focus position at the time a shooting instruction button was operated (focus position of a reference image) is closest to the close up end of all the images that will be combined, and an interval between focus positions when images P1 and P6 were acquired is larger than a specified interval L. In this case, even if combination is performed by distributing image P1 to image processing circuit A as well as distributing image P1 to image processing circuit B, there is a certain distance between the focus position of image Pa and the focus position of image P6, and so it is not possible to obtain an appropriate combination effect. Specifically, an interval between the focus position at which image P1 (reference image) was acquired and the focus position at which image P6 was acquired is larger than L, and so alignment of the two images P1 and P6 in the image processing circuit B with good precision is difficult. This means that there is a possibility of in degradation of image quality of a focus stacked image that is finally generated.

Therefore, an image other than image P1 (which was initially made a reference image in the example of FIG. 6A) that was acquired at the time the shooting instruction button was operated is changed to a plural distribution image, and this plural distribution image is distributed to both the image processing circuit A and the image processing circuit B (refer, for example, to S25 and S27 in FIG. 9 which will be described later). For example, among images distributed to image processing circuit B, first an image that has a focus position closest to image P1 that was initially made a reference image among images distributed to image processing circuit A is selected (image P6 in the example of FIG. 6A), then an image whose focus position interval to this selected image (image P6 in this example) is less than the specified interval L, and is closest to P1 (image P3 with the example of FIG. 6A) which is a reference when performing combination processing, is distributed to image processing circuit B as a changed plural distribution image. Since this changed image P3 is distributed to both the image processing circuit A and the image processing circuit B, it is called a plural distribution image.

It should be noted that the specified interval L may be determined based on a focus position interval for permissible circle of confusion of the lens. For example if focus position interval for part of permissible circle of confusion is made 1δ, then the specified interval L may be made 15δ. A difference between focus position where images P1 and P6 were acquired may be compared with the specified interval L.

In this way, in the example shown in FIG. 6A, image P3 is distributed to the image processing circuits A and B. In the case of focus stacking processing performed in image processing circuit A, in the first combination processing images P1 and P2 are aligned and a focus stacked image is generated, and in the second combination processing image P3 is aligned with the focus stacked image that was generated in the first combination processing to generate a focus stacked image. After that, focus stacked images are similarly generated using images P4 and P5. Also in the case of focus stacking processing performed in image processing circuit B, in the first combination processing image P3 and image P6 are aligned and a focus stacked image is generated, and in the second combination processing image P7 is aligned with the focus stacked image that was generated in the first combination processing to generate a focus stacked image. After that, focus stacked images are similarly generated using images P8 to P10. If a focus stacked image is generated in image processing circuit B, then next a final focus stacked image is generated using this generated focus stacked image and a focus stacked image that was generated in image processing circuit A. With this processing procedure, since focus stacking processing is performed within respective image processing circuit using a shared image, it is possible to achieve good alignment at the time of performing final focus stacking processing using focus stacked images generated in each circuit, and to reduce degradation in image quality.

It should be noted that with the above described processing procedure for focus stacking, reference images were different for the image processing circuit A and the image processing circuit B, but focus stacking processing may also be performed using a shared reference image (with this example, image P3) in both processing circuits A and B. In this case a focus stacked image is generated by image processing circuit A by aligning image P3 and image P1 in first combination processing, and a focus stacked image is generated in second combination processing by aligned image P2 with the focus stacked image that was generated in the first combination processing. After that, focus stacked images are similarly generated using images P4 and P5. Processing, and the procedure to generate a final focus stacked image, in image processing circuit B is the same as for the procedure described above, and so description is omitted. With this processing procedure since a reference image is shared it is possible to accurately align focus stacked images that have been generated by the image processing circuits A and B, and it is possible to reduce image degradation.

Selection of a reference image for at the time of focus stacking in the image processing circuit A and the image processing circuit B may be shared in both circuits, as described above, or different reference images may be determined in advance as part of the design of the camera. However, depending on shooting conditions, an optimally suitable reference image may be automatically selected. For example, a reference image may be automatically selected taking into consideration focus position of an image and specified interval L etc. at the time a shooting instruction button was operated.

Also, since AF (automatic focus adjustment) is generally performed at the time a shooting instruction button has been operated, it is possible to obtain an in focus image, that is an image having a lot of high frequency components. However, in the case of a reference image that has been changed, since focus position becomes different this image has few high frequency components and may be a case of an out of focus image. In a case where such a reference image that has been changed does not contain high frequency components, a different image may be selected.

For example, high-frequency components of all taken images may be detected, and selection performed by excluding images that have fewer high-frequency components than an average value of high frequency components for all images, from images that are distributed to a plurality of image processing circuits (refer, for example, to S29 and S27 in FIG. 9). In this way it is possible to implement combination for a plurality of image processing circuits with image quality degradation suppressed. Also, this type of procedure is not limited to selection of a reference image, and it is also possible to exclude images having few high-frequency components from image groups that are subjected to focus stacking. Images that have few high-frequency components have few high sharpness portions that will be adopted at the time of focus stacking processing, and it is possible to shorten processing time by excluding these images.

Also, if it is desired to simplify determination for changing the reference image it is possible, for example, to select an image having a central focus position (image P3 in the example shown in FIG. 6A) and distribute that image to image processing circuit B. In this case, a reference image for combination is image P1 at image processing circuit A and image P3 at image processing circuit B. Specifically, a reference image for combination differs with image processing circuit. As a reference image it is only necessary to select an image that is simply central within an image group, and it is then possible to shorten processing time for selection.

Figure 6B:
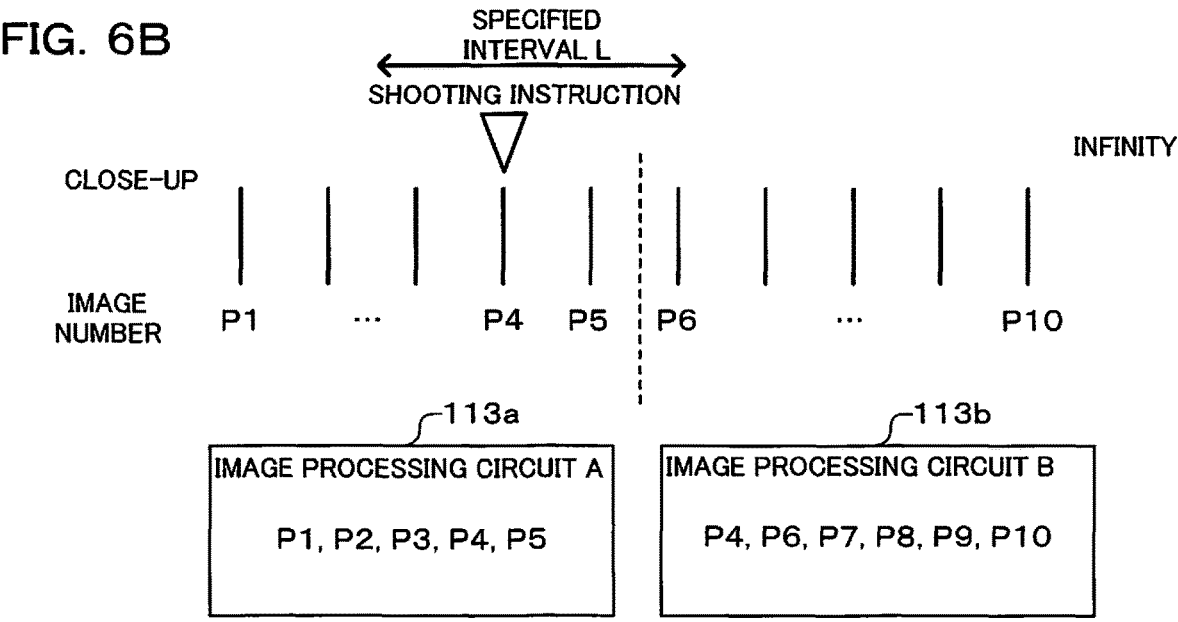

Also, as shown in the example of FIG. 6B, in a case where image P4 is a combination reference image, in the event that an interval between focus position of images P4 and P6 is less than the specified interval L then image P4 is also distributed to image processing circuit B in addition to image processing circuit A, and combination is executed in a plurality of image processing circuits. In this case, the combination reference image is made P4 for both the image processing circuit A and the image processing circuit B. Also, for example, in a case where an interval between focus positions of images P5 and P6 is more than the specified interval L, it is not possible to select a plural distribution image within the specified interval L. Since it is not possible to select a plural distribution image for the purpose of improving precision of alignment, image P5 that has focus position closest to image P6 may also be distributed, and a plural distribution image for shortening combination processing time done away with.

In this way, it is possible to set whether to distribute an image constituting a combination reference to both image processing circuits (refer, for example, to FIG. 6B), or to distribute other images that are not an image constituting a combination reference to both image processing circuits (refer, for example, to FIG. 6A), from a relationship between focus position of an image constituting a combination reference and focus position of images that will be distributed to each image processing circuit. As a method for setting the latterly described other images, an appropriate method may be selected, such as a case of performing setting based on specified interval L, and a method of setting an image having a central focus position.

Accordingly, with this embodiment an image for at least one focus position is selected from among a plurality of images for different focus positions (this image is called a plural distribution image) (image P3 with the example of FIG. 6A, image P4 with the example of FIG. 6B), this plural distribution image that has been selected is distributed to image processing circuits A and B, and images other than the plural distribution image (images P1 to P2, and P4 to P10 with the example of FIG. 6A images P1 to P3, P5, and P6 to P10 with the example of FIG. 6B) are distributed to either one of the plurality of image processing circuits A and B. Since a plural distribution image is selected in accordance with focus position in this way, it is possible to maintain alignment precision, and it is possible to prevent image quality degradation of a combined image.

Also, with this embodiment, if an interval between focus position of a reference image (image P1 with the example of FIG. 6A, image P4 with the example of FIG. 6B) and focus position of an image that is closest (image P6 in the examples of FIG. 6A and FIG. 6B) within a group of adjoining images (with the example of FIG. 6 the image group that is distributed to image processing circuit B) is wider than a specified interval L (refer to the example of FIG. 6A) an image other than a first combination reference image is selected as a plural distribution image, while if the interval between focus positions is narrower than the specified interval (refer to FIG. 6B) then the first combination reference image (image P4 with the example of FIG. 6B) is selected as the plural distribution image. In this way, since a plural distribution image is selected in accordance with an interval between the focus position of a reference image and focus position of an image of which focus position is closest within a group of adjoining images, it is possible to ensure alignment precision, and it is possible to prevent image quality degradation of a combined image.

Next, an further example of distributing a plurality of image data to two image processing circuits, namely image processing circuit A (image processing circuit 113a) and image processing circuit B (image processing circuit 113b) will be described using FIG. 7. With the examples of distribution that were shown in FIG. 3A and FIG. 3B, and in FIG. 6A and FIG. 6B, with a substantially middle position of focus position between the close up side and the infinity side as a border, images on one side were distributed to image processing circuit A and images on the other side were distributed to image processing circuit B. With this example shown in FIG. 7, in a case where intervals between focus positions of each image are narrow, a method of distributing to a plurality of image processing circuit is changed in order to increase combination precision (refer, for example, to S19, S21, and S23 in FIG. 9. Specifically, with the examples that were shown in FIG. 3A and FIG. 3B, and in FIG. 6A and FIG. 6B, division was performed depending on how long or short a distance between focus positions (shooting positions) was. However, with the example shown in FIG. 7 in a case where focus position interval is narrower than specified interval L1, division alternates with how far apart or close together the focus positions are, and if the focus position interval is wider than specified interval L1 there is division based on distance, namely division so as to give successive focus positions. It should be noted that specified interval L1 is different from the previously described specified interval L, and may be, for example, 3δ.

The upper part T of FIG. 7 shows images that have been acquired while changing focus position of a focus lens. With this example images P1 to P10 are acquired moving from the close up side to the infinity side, and image P5 is an image that was acquired at the point in time when the shooting instruction button was operated.

Also, the lower part U of FIG. 7 shows distribution destinations for images that have been acquired. Images P1, P3, P5, P7, and P9 shown in U1 are distributed to image processing circuit A (image processing circuit 113a), while images P2, P4, P5, P6, P8, and P10 shown in U2 are distributed to image processing circuit B (image processing circuit 113b). Specifically, successive adjoining images (P1 to P4) and images (P6 to P10) are respectively distributed to separate image processing circuits, and image P5 that was acquired at the point in time when the shooting instruction button was operated is distributed to both image processing circuits A and B as a reference image.

In this way, with the example shown in FIG. 7, the setting section changes assignments for images to be distributed to either of a plurality of image processing circuits in accordance with intervals between respectively adjoining focus positions of a plurality of images for different focus positions. Also, the setting section divides images to close up side and infinity side in the event that comparison of interval between respectively adjoining focus positions of a plurality of images for different focus positions and a specified value is wider than the specified value, while if the interval is narrower than the specified value alternatively divides in accordance with respective focus positions (refer, for example, to S19, S21, and S23 in FIG. 9). It is possible to ensure constant intervals between focus positions, and in particular in the event that interval between focus positions is narrow it is possible to generate a combined image using images for which respective focus positions are close, which means that it is possible to create a focus stacked image of high image quality.

Next a case where three image processing circuits A, B, and C are provided in the image processing section will be described using FIG. 8. With the example shown in FIG. 8, images P1 to P15 are acquired as images for combination, and among these images a first combination reference image that was acquired at the time the shooting instruction button was operated is made P6. These 15 images are substantially evenly divided into five images in the image processing circuit A 113a, six images in the image processing circuit B 113b and six images in the image processing circuit C 113c.

Here, in order to combine a result of combination in image processing circuit A with the resulting combination in image processing circuit C, with the result of combination in image processing circuit B as a reference that previously includes the first combination reference image (image P6), it is preferable to make the number of images for the image processing circuit B a maximum number. Also, an interval between image P4 within image processing circuit A that has focus position closest to image P6, and image P6, is within a specified interval L, and so image P6 is also distributed to image processing circuit A. On the other hand an interval between image P6 and image P11 that is closest to the focus position of image P6 within image processing circuit C is beyond the specified interval L and so image P8 is distributed to image processing circuit C in accordance with the method that was described in FIG. 6A.

In the case of using two image processing circuits there was a single plural distribution image (image distributed to a plurality of image processing circuits), but in the case of using three image processing circuits there are two plural distribution images. However, in a case where the first combination reference image was provisionally made P8, since image P8 is distributed to image processing circuit A and to image processing circuit C, in this case only a single image is distributed as a reference image. If 15 images are sequentially combined by a single image processing circuit, it will require combination time for 14 combinations, but if images are divided into three, as with this example, combination can be completed in a combination time for seven combinations.

Figure 4:
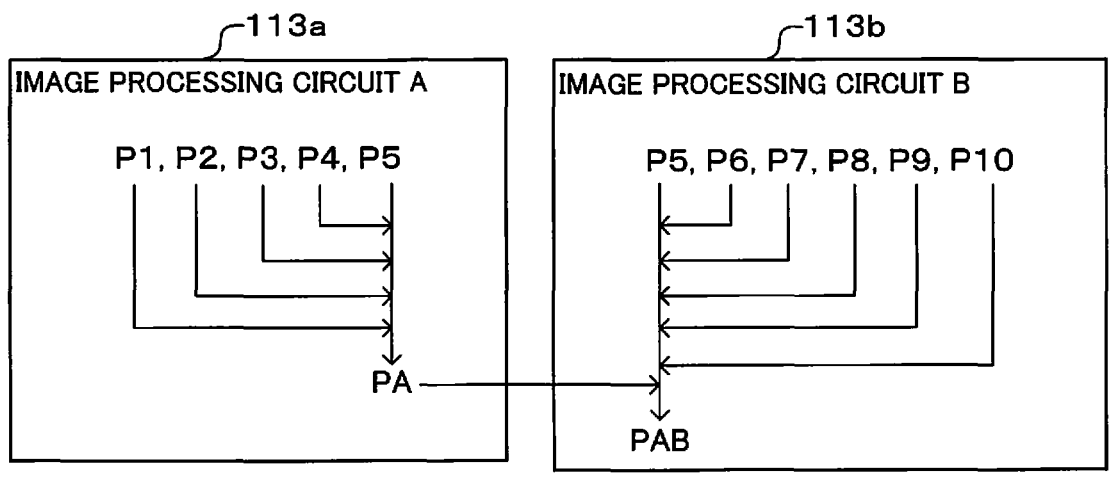
FIG. 4 is a drawing showing a procedure for combination processing of images that have been divided, in the camera of one embodiment of the present invention.

At the time of focus stacking, as was described using FIG. 4, in the image processing circuit A, image P6 that has been made a first reference image and image P4 are subjected to focus stacking, this focus stacked image (P6+P4) and image P3 are subjected to focus stacking, and after that sequentially subjected to focus stacking with images P2 and P1. Also, in the image processing circuit B, image P6 that has been made a first reference image and image P5 are subjected to focus stacking, this focus stacked image (P6+P5) and image P7 are subjected to focus stacking, and after that sequentially subjected to focus stacking images with images P8 to P10. P6 that has been made a first reference image, and P8 that has been made a second reference image are subjected to focus stacking, this focus stacked image is subjected to focus stacking with P7, and after that may be subject to focus stacking with P5 and P8 to P10. Also, in the image processing circuit C, image P8 that has been made a second reference image and image P11 are subjected to focus stacking, this focus stacked image (P8+P11) and image P12 are subjected to focus stacking, and after that sequentially subjected to focus stacking images with P13 to P50. Continuing on, the image processing circuit B performs focus stacking with an image that was focus stacked in image processing circuit B using an image that was focus stacked in image processing circuit A, and further a final focus stacked image is generated using this image that has been focus stacked and an image that has been focus stacked in image processing circuit C.

In a case where at least three image processing circuit are provided, a plurality of images are acquired while shifting focus position, and the plurality of images that have been acquired are divided into three or more image groups, a processor (setting section) sets a second combination reference image (image P8 with the example of FIG. 8) in addition to the first combination reference image (image P6 with the example of FIG. 8), sets which of either the first combination reference image or the second combination reference image to make a combination reference image in respective image processing circuits (with the example of FIG. 8, image P6 in image processing circuit A, image P6 in image processing circuit B, and image P8 in image processing circuit C), and the image processing circuits combine with a combination reference image that has been set by the setting section among images that have been distributed, in order from an image for which focus position is close to the focus position of the reference image. As a result, even in a case where a lot of images are subjected to combination processing, since it is possible to perform processing in parallel with the three or more image processing circuits it is possible to shorten processing time. Also, since combination processing is performed with a shared combination reference set, it is possible to prevent degradation in image quality.

Next, operation of image distributing setting in step S3 that was described using FIG. 3A to FIG. 8 will be described using the flowchart shown in FIG. 9.

If the flow for image distribution setting is entered, it is first determined whether or not a number of taken images is more than a specified number (S11). As was described previously, in a case where there are only a few images to be combined the effect of improving processing time is only slight even with parallel processing using a plurality of image processing circuits, and so it is determined whether or not a number of images that were acquired in step S1 is a number of images with which improvement in processing time can be expected. If the result of this determination is that the number of taken images is fewer than a specified number, the images that have been acquired are not divided, this flow is terminated, and the originating flow is returned to.

On the other hand, if the result of determination in step S11 is that the number of taken images is more than the specified number, it is next determined whether shooting is for image storage or is for live view (S13). Acquisition of image data that is performed before the shooting instruction button is operated is for live view, and acquisition of image data that is performed after the shooting instruction button has been operated is for image storage.

If the result of determination in step S13 is for live view, images are successively divided into N groups (S15). Here, images that were acquired in step S1 are simply divided into N groups in accordance with a number (N) of image processing circuits, from the close up side to the infinity side, without setting a reference image for combination. The number of divisions N may be set manually by the photographer, and may be set automatically based on a range of focus position in which image data is acquired. Once division of images has been performed, the flow for image distribution setting is terminated and the originating flow is returned to. In a case where focus stacking display is performed with live view, in step S7 focus stacking processing is respectively performed for every image processing circuit, finally respective focus stacked image are further subjected to focus stacking processing, and displayed on the display section 141.

On the other hand, if the result of determination in step S13 is for image storage, reference image setting is performed (S17). Generally, an image that was acquired at the time the shooting instruction button was operated is set as a reference image (first combination reference image) (refer, for example, to FIG. 3A, FIG. 3B, FIG. 6A, FIG. 6B, FIG. 7 and FIG. 8). However, this is not limiting, and as a reference image an image for which focus position is substantially in the middle, among focus positions between the close up side and the infinity side, within a plurality of images, may be appropriately determined.

Once a reference image has been set in step S17, next a plural distribution image is set (S18). As was described previously, a plural distribution image is an image that is distributed to a plurality of image processing circuits 113a, 113b etc. It should be noted that even if the reference image is set as the plural distribution image in this step, there may be cases where the plural distribution image is changed in steps S23 and S27, which will be described later.

If setting of a reference image has been performed, it is next determined whether or not focus position interval is wider than specified interval L1 (S19). In order to generate a focus stacked image, image data is acquired at a plurality of focus positions, but as was described previously, the plurality of focus positions are set manually by the photographer, or set automatically in accordance with shooting conditions such as temperature, focal length, focus position etc. in step S1 (FIG. 2). In this step, as was described using FIG. 7, interval between a plurality of focus positions is compared with specified interval L1, and determination is based on the determination result If the result of determination in step S19 is that the focus position interval is wider than specified interval L1, images are successively divided into N groups (S21). In this case, as was shown in FIG. 3B, FIG. 7 and FIG. 8 etc., image data that was acquired in step S1 is simply divided into N groups, from the close up side to the infinity side, in accordance with a number (N) of image processing circuits. The number of divisions N may be set manually by the photographer, and may be set automatically based on a range of focus position in which image data is acquired.

On the other hand, if the result of determination in step S19 is that the focus position interval is narrower than specified interval L1, images are successively divided into N groups in accordance with how close or far away they are (S23). In this case, as was shown in the lower part U of FIG. 7, images are alternately divided by focus position, with some being assigned to image processing circuit A and others being assigned to image processing circuit B. A plural distribution image that has already been set is assigned to both image processing circuits A and B. It should be noted that in a case where there are three or more image processing circuits also, similarly, an image of a first focus position is assigned to image processing circuit A, an image of a second focus position is assigned to image processing circuit B, an image of a third focus position is assigned to image processing circuit C, . . . , an image of an Nth focus position is assigned to image processing circuit N, and after that images are assigned in order to image processing circuits. Once division of images has been performed, the flow for image distribution setting is terminated and the originating flow is returned to.

If images have been successively divided into N groups in step S21, it is next determined whether or not from a focus position of a reference image to a focus position that is closest within adjoining image groups is within specified interval L. Here, as was described using FIG. 6A and FIG. 6B, it is determined whether an interval from a reference image (set in step S17) to an image that is closest to the reference image, among image groups adjacent to the image group in which the reference image is included, is within specified interval L. If the result of this determination is that from focus position of the reference image to a focus position that is closest among adjacent image groups is within specified interval L, then after setting the reference image to the plural distribution image the flow for image distribution setting is terminated on the originating flow is returned to.

If the result of determination in step S25 is that from focus position of the reference image to focus position that is closest among the adjacent image groups is not within specified interval L, the plural distribution image is changed (S27). As was described using FIG. 6A, in a case where focus position of the reference image that was initially set is apart from focus position of an image that is closest to the reference image among adjoining image groups, there will be degradation in image quality of a finally obtained focus stacked image, and so an image for a different focus position is changed to the plural distribution image. This plural distribution image change is performed by selecting an image at a focus position within specified interval L from focus position of an image that is closest to the reference image among adjoining image groups.

Figure 8:
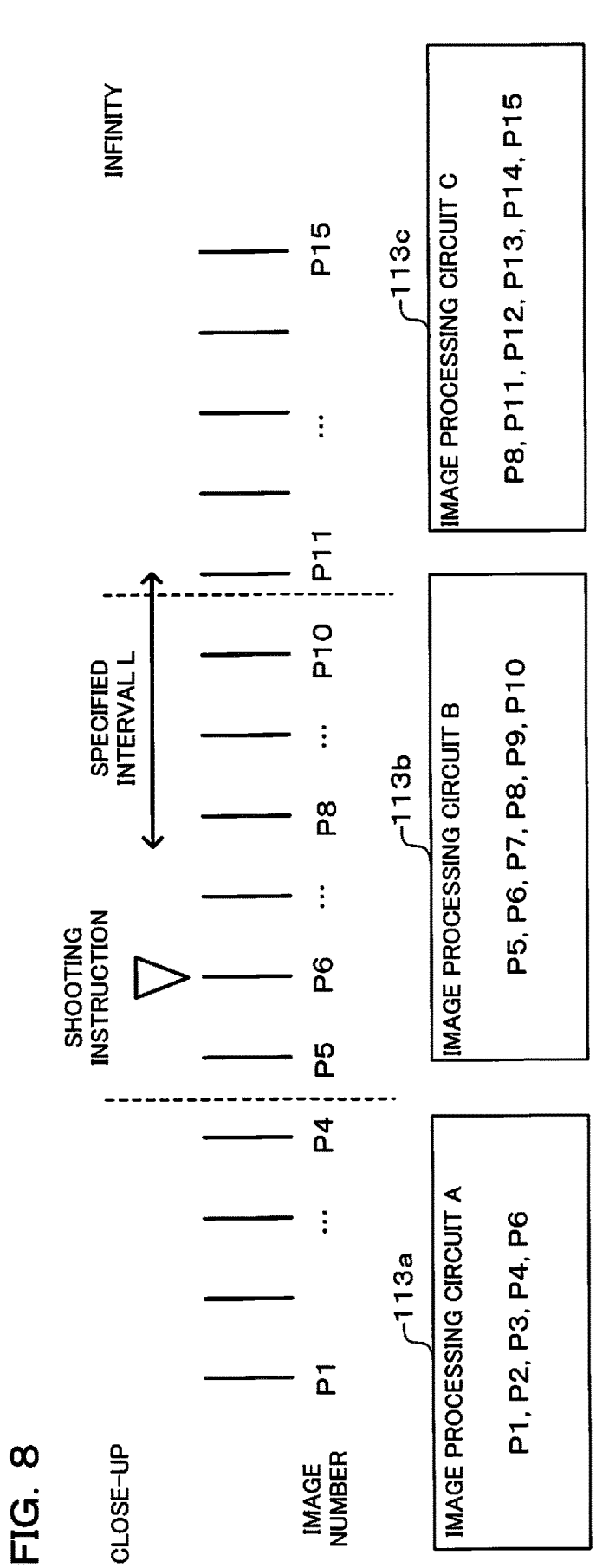
FIG. 8 is a drawing showing a further example of image input and image division, in the camera of one embodiment of the present invention.

Also, in step S27, if three or more image processing circuits have been provided, then as was described using FIG. 8 setting is performed in the second image processing circuit B and the third image processing circuit C so that a shared image becomes the reference image.

Once the reference image has been changed, it is next determined whether high frequency component of the plural distribution image is smaller than a specified value (S29). Images that have few high frequency components are often out of focus images, and are not suitable as reference images when performing focus stacking processing. Therefore, in this step, it is determined whether or not high frequency component of a plural distribution image that has been changed is smaller than a specified value.

If the result of determination in step S29 is that high frequency component of the plural distribution image is smaller than a specified value, processing returns to step S27 and the plural distribution image is changed again. In this case, a plural distribution image is selected from among images that are within the specified interval L from focus position of an image that is closest to the reference image, among adjoining image groups, as was described previously. It should be noted that in a case where three or more image processing circuits are provided, if any of a plurality of reference images has few high frequency components, change is performed again for a reference image having few high-frequency components.

On the other hand, if the result of determination in step S29 is that high frequency component of a reference image is not smaller than a specified value, the flow for image distribution setting is terminated and the originating flow is returned to.

In this way, a reference image is set with the flow for image distribution setting (refer to S17). Then, a plurality of images are divided into N image groups, and for image groups that have been divided, if focus position that is closest to a reference image within an adjoining image group, from focus position of a reference image, is not within specified interval L, the plural distribution image is changed (refer S25 to and S27). The plural distribution image that has been selected here is commonly distributed to a plurality of image processing circuits. Since the plural distribution image is commonly distributed to a plurality of image processing circuits and used at the time of combination processing, it is possible to prevent image quality degradation.

It should be noted that in the flow for image distribution setting each processing step may be appropriately omitted, or processing steps may be added, as required. Also, the procedure may be appropriately changed besides the description of the flow in FIG. 9.

As has been described above, in the one embodiment of the present invention, in an image combining device having a memory that stores a plurality of images for different focus positions and focus positions at the time the plurality of images were required (refer, for example, to S1 in FIG. 2), assignments for distributing a plurality of images of different focus positions to a plurality of image processing circuits are set (refer, for example, to S3 and S5 in FIG. 2), assignment is performed so that when distributing the plurality of images an image for at least one focus position among a variety of images of different focus positions is distributed to the plurality of image processing circuits as a plural distribution image, images other than the plural distribution image are distributed to either of the plurality of image processing circuits (refer, for example, to FIG. 3A, FIG. 3B, FIG. 6A, FIG. 6B, FIG. 7, FIG. 8, and S25 and S27 in FIG. 9 etc.), and in the respective plurality of image processing circuits a plurality of images of different focus positions are combined to generate a combined image (refer, for example, to S7 in FIG. 2, FIG. 4, FIG. 5 etc.). Since a shared plural distribution image is distributed to image processing circuit and used in combination processing, focus stacking processing is possible in a short time and without image quality degradation.

It should be noted that in the one embodiment of the present invention, description has been given of a case where focus stacking processing has been performed as combination processing, but the combination processing is not thus limited, and can also be applied as long as it is combination processing performed with different focus positions, such as combination that achieves an effect of increasing background blur by detecting background portions of images, and combining images for different focus positions with a background. Also, with the one embodiment of the present invention, a reference image was set in a case where image storage is performed (refer, for example, to S13 and S17 in FIG. 9). However, a reference image may also be set in a case where it is desired to display a focus stacked image of high image quality even if significant processing time is required at the time of live view, and focus stacking processing that uses the plural distribution image such as shown in the one embodiment of the present invention may also be performed. Also, a plurality of images that have been taken while making focus position different may be prepared in advance, and these images stored in memory of an imaging device such as a camera or an information processing device such as a personal computer, and focus stacking processing such as shown in the one embodiment of the present invention may also be performed using a plurality of images stored in this memory.

Also, with the one embodiment of the present invention, the high frequency component detection section 111, image processing section 113 etc. are constructed separately from the microcomputer 131, but some or all of these sections may be constituted by software, and executed by a CPU within the microcomputer 131. Also, description has been given with the setting section 133 and various functions implemented by the microcomputer 131 in accordance with a program, but these functions may also be implemented using hardware circuits. Also, besides being constructed using hardware circuits and simple parts, the setting section 133, high frequency component detection section 111, image processing section 113, etc. may also be constructed in the form of software using a CPU and programs, or may be constructed in hardware such as gate circuitry generated based on a programming language described using Verilog, or may use a hardware structure that uses software such as a DSP (digital signal processor). A microcomputer may also be implemented using an ASIC (Application Specific Integrated Circuit), FPGA (Field-Programmable Gate Array) etc. Suitable combinations of these approaches may also be used.

Also, with the one embodiment of the present invention, an instrument for taking pictures has been described using a digital camera, but as a camera it is also possible to use a digital single lens reflex camera or a mirror-less camera or a compact digital camera, or a camera for movie use such as a video camera, and further to have a camera that is incorporated into a mobile phone, a smartphone, a mobile information terminal, personal computer (PC), tablet type computer, game console etc., or a camera for medical use, a camera for mounting on a vehicle, a surveillance camera etc. or a camera for a scientific instrument that adjusts in focus position by adjusting a distance between an objective lens and a stage on which a subject is fixed, such as a digital microscope. In any event, it is possible to apply the present invention to a device or software etc. for taking images for performing combination processing of a plurality of images.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An image combining device, comprising:
 a memory that stores a plurality of images for different focus positions, and focus positions when the plurality of images were acquired,
 a plurality of image processing circuits that combine the plurality of images for different focus positions to generate a combined image, and a processor that sets assignment for distributing the plurality of images for different focus positions to the plurality of image processing circuits, wherein the processor makes an image for at least one focus position, among the plurality of images for different focus positions, a plural distribution image and sets assignment so that the plural distribution image is distributed to the plurality of image processing circuits, and images other than the plural distribution image are distributed to any one of the plurality of image processing circuits.

2. The image combining device of claim 1, wherein:

the processor sets a first combination reference image to be a reference for combination from among a plurality of images for the different focus positions, and selects the plural distribution image in accordance with an interval between an image for a focus position that is closest to the first combination reference image, among the plurality of images for different focus positions that have been distributed to an image processing circuit that the first combination reference image has not been distributed to, and the first combination reference image.

3. The image combining device of claim 2, wherein:

the processor selects an image other than the first combination reference image as the plural distribution image if an interval between the focus positions is wider than a specified interval, and selects the first combination reference image as the plural distribution image if the interval between focus positions is narrower than a specified value.

4. The image combining device of claim 3, wherein:

the processor sets the plural distribution image to a second combination reference image, and sets either the first combination reference image or the second combination reference image to a combination reference image in the respective image processing circuits, and the image processing circuits sequentially combine from images closest to a focus position with the combination reference image that was set by the processor, among images that have been distributed.

5. The image combining device of claim 3, further comprising:

a high frequency component detection circuit that detects high frequency components of a plurality of images for different focus positions, and wherein the processor selects the plural distribution image based on a result of having compared respective high frequency components of the plurality of images for different focus positions with a threshold value.

6. The image combining device of claim 5, wherein:

the threshold value is set based on an average value of respective high frequency components of the plurality of images for different focus positions.

7. The image combining device of claim 1, wherein:

the processor changes assignment of images to be distributed to either of the plurality of image processing circuits in accordance with intervals of respectively adjoining focus positions of the plurality of images for different focus positions.

8. The image combining device of claim 7, wherein:

the processor divides images to close up side and infinity side in the event that comparison of interval between focus positions of the plurality of images for different focus positions that are respectively adjoining, and a specified value, is wider than the specified value, while if the interval is narrower than the specified value alternatively divides in accordance with respective focus positions.

9. The image combining device of claim 1, further comprising:

a storage medium for storing the combined image; and a display for displaying the combined image, wherein the processor sets assignments so as to distribute the plural distribution image to the plurality of image processing circuits in the event that the combined image is to be stored in the storage medium, while if the combined image is to be displayed on the display without being stored in the storage medium, distribute the plural distribution image to either of the image processing circuits.

10. An image combining method, for an image combining device that comprises a memory that stores a plurality of images for different focus positions, and focus positions when the plurality of images were acquired, and a plurality of image processing circuits that combine the plurality of images for different focus positions to generate a combined image, comprising:

setting assignment for distributing the plurality of images for different focus positions to the plurality of image processing circuits;

when distributing the plurality of images, making an image for at least one focus position, among the plurality of images for different focus positions, a plural distribution image, and assigning so that so that the plural distribution image is distributed to the plurality of image processing circuits, and images other than the plural distribution image are distributed to any one of the plurality of image processing circuits; and generating a combined image by combining the plurality of images for different focus positions in each of the plurality of image processing circuits.

11. The image combining method of claim 10 further comprising:

setting a first combination reference image to be a reference for combination from among the plurality of images for the different focus positions, and selecting the plural distribution image in accordance with an interval between an image for a focus position that is closest to the first combination reference image, among the plurality of images for different focus positions that have been distributed to an image processing circuit that the first combination reference image has not been distributed to, and the first combination reference image.

12. The image combining method of claim 11 further comprising:

selecting an image other than the first combination reference image as the plural distribution image if an interval between the focus positions is wider than a specified interval, and selecting the first combination reference image as the plural distribution image if the interval between focus positions is narrower than a specified value.

13. The image combining method of claim 12 further comprising:

setting the plural distribution image to a second combination reference image, and setting either the first combination reference image or the second combination reference image to a combination reference image in the respective image processing circuits, and having the image processing circuits sequentially combine from images closest to a focus position with the combination reference image that was set, among images that have been distributed.

14. The image combining method of claim 12, wherein the image combining device further comprises:
a high frequency component detection circuit that detects high frequency components of a plurality of images for different focus positions, the image combining method further comprising
selecting the plural distribution image based on a result of having compared respective high frequency components of the plurality of images for different focus positions with a threshold value.

15. The image combining method of claim 14, wherein:
the threshold value is set based on an average value of respective high frequency components of the plurality of images for different focus positions.

16. The image combining method of claim 10 further comprising:
changing assignment of images to be distributed to either of the plurality of image processing circuits in accordance with intervals of respectively adjoining focus positions of the plurality of images for different focus positions.

17. The image combining method of claim 10 further comprising:
dividing images to close up side and infinity side in the event that comparison of interval between focus positions of the plurality of images for different focus positions that are respectively adjoining and a specified value is wider than the specified value, while if the interval is narrower than the specified value alternatively dividing in accordance with respective focus positions.

18. A non-transitory computer-readable medium storing a processor executable code, which when executed by at least one processor, which is included in an image combining device, performs an image combining method, the image combining device comprising a memory that stores a plurality of images for different focus positions, and focus positions when the plurality of images were acquired, and a plurality of image processing circuits that combine the plurality of images for different focus positions to generate a combined image, the image combining method comprising:
acquiring a plurality of images for different focus positions;
setting assignment for distributing the plurality of images for different focus positions to a plurality of image processing circuits;
when distributing the plurality of images, making an image for at least one focus position, among the plurality of images for different focus positions, a plural distribution image, and assigning so that so that the plural distribution image is distributed to the plurality of image processing circuits, and images other than the plural distribution image are distributed to any one of the plurality of image processing circuits; and
generating a combined image by combining the plurality of images for different focus positions that have been assigned, in each of the plurality of image processing circuits.

* * * * *